US010243996B2

(12) United States Patent
Astigarraga et al.

(10) Patent No.: US 10,243,996 B2
(45) Date of Patent: Mar. 26, 2019

(54) LAN/SAN NETWORK SECURITY MANAGEMENT

(71) Applicant: International Business Machines Corporation, Armonk, NY (US)

(72) Inventors: Tara Astigarraga, Rochester, NY (US); Christopher V. DeRobertis, Hopewell Junction, NY (US); Louie A. Dickens, Tucson, AZ (US); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 14/988,466

(22) Filed: Jan. 5, 2016

(65) Prior Publication Data
US 2017/0195344 A1 Jul. 6, 2017

(51) Int. Cl.
| | |
|---|---|
| *H01L 29/06* | (2006.01) |
| *H04L 29/06* | (2006.01) |
| *H04L 12/46* | (2006.01) |
| *H04L 12/24* | (2006.01) |
| *H04L 29/08* | (2006.01) |

(52) U.S. Cl.
CPC .......... *H04L 63/20* (2013.01); *H04L 12/4675* (2013.01); *H04L 41/0853* (2013.01); *H04L 41/0866* (2013.01); *H04L 41/12* (2013.01); *H04L 41/142* (2013.01); *H04L 63/1408* (2013.01); *H04L 63/1441* (2013.01); *H04L 67/1097* (2013.01); *H04L 67/16* (2013.01); *H04L 67/42* (2013.01)

(58) Field of Classification Search
CPC ....................................................... H04L 63/20
See application file for complete search history.

(56) References Cited

U.S. PATENT DOCUMENTS

| | | | |
|---|---|---|---|
| 6,597,956 B1* | 7/2003 | Aziz .................... | G06F 9/45504 700/101 |
| 9,823,849 B2* | 11/2017 | Schmisseur .......... | G06F 3/0608 |
| 2003/0126202 A1* | 7/2003 | Watt ..................... | G06F 9/4401 709/203 |
| 2005/0044199 A1* | 2/2005 | Shiga ................... | G06F 17/302 709/223 |

(Continued)

FOREIGN PATENT DOCUMENTS

JP            2009110166 A         5/2009

OTHER PUBLICATIONS

Czerwinski et al.; An architecture for a secure service discovery service; Proceeding MobiCom '99 Proceedings of the 5th annual ACM/IEEE international conference on Mobile computing and networking; pp. 24-35; Seattle, Washington, USA ; Aug. 15-19, 1999; ACM Digital Library (Year: 1999).*

(Continued)

*Primary Examiner* — Bradley Holder
(74) *Attorney, Agent, or Firm* — Kunzler, PC

(57) ABSTRACT

An apparatus for managing network security includes an inventory module, a survey module, an observation module, and a security module. The inventory module identifies each node of a network. The survey module gathers information for each node of the network. The security module generates notifications to one or more users in response to the observation module detecting one or more irregularities.

20 Claims, 7 Drawing Sheets

(56) References Cited

U.S. PATENT DOCUMENTS

| | | | |
|---|---|---|---|
| 2005/0060535 A1* | 3/2005 | Bartas | H04L 63/02 713/154 |
| 2006/0248205 A1* | 11/2006 | Randle | H04L 63/0869 709/229 |
| 2008/0310421 A1* | 12/2008 | Teisberg | H04L 12/4641 370/395.53 |
| 2010/0122334 A1 | 5/2010 | Stanzione et al. | |
| 2010/0257607 A1 | 10/2010 | Falola et al. | |
| 2011/0010633 A1* | 1/2011 | Richmond | H04L 41/12 715/736 |
| 2011/0119748 A1* | 5/2011 | Edwards | G06F 9/5077 726/12 |
| 2012/0272298 A1 | 10/2012 | Jibbe et al. | |
| 2014/0185627 A1* | 7/2014 | Ditya | H04L 45/44 370/409 |
| 2014/0189094 A1* | 7/2014 | Ditya | H04L 45/245 709/224 |
| 2016/0057121 A1* | 2/2016 | Metsala | H04L 63/0823 713/175 |

OTHER PUBLICATIONS

Zhu et al.; Splendor: A secure, private, and location-aware service discovery protocol supporting mobile services; Proceedings of the First IEEE International Conference on Pervasive Computing and Communications, 2003; Mar. 26-26, 2003; (PerCom 2003); IEEE Xplore (Year: 2003).*

Alruban, A. et al.; "Two Novel 802.1x Denial of Service Attacks"; 2011 European Intelligence and Security Informatics Conference, pp. 183-190; IEEE; 2011.

Kim, M. et al.; "Integrated Notification Architecture Based on Overlay Against DDoS Attacks on Convergence Network"; Software Technologies for Embedded and Ubiquitous Systems, 5th IFIP WG 10.2 International Workshop, SEUS 2007.; pp. 466-476; 2007.

Internet Society RFCS et al.; "Link-Layer Event Notifications for Detecting Network Attachments"; An IP.com Prior Art Database Technical Disclosure; http://ip.com/IPCOM/000156871; Aug. 8, 2007.

Internet Society RFCS et al.; "Network Configuration Protocol (NETCONF) Base Notifications"; An IP.com Prior Art Database Technical Disclosure; http://ip.com/IPCOM/000215142; Feb. 21, 2012.

* cited by examiner

LAN/SAN NETWORK SECURITY MANAGEMENT

FIELD

The subject matter disclosed herein relates to network security and more particularly relates to managing local area network ("LAN") and storage area network ("SAN") security.

BACKGROUND

The exponential growth of the creation of digital data means increased storage needs. IaaS (Infrastructure as a Service) providers offer scalable physical and/or virtual computing resources, including network storage, to meet users' needs so that they do not have to build or maintain their own infrastructure. Network storage is both a computing resource and a building block of other computing resources. Network storage security relies in part on accurate and timely tracking of both physical and virtual storage devices.

BRIEF SUMMARY

An apparatus for managing network security is disclosed, the apparatus including an inventory module, a survey module, an observation module, and a security module. The inventory module identifies each node of a network, the network comprising a plurality of virtual local area networks and a storage area network. The survey module gathers information for each node of the network. The observation module analyzes the network to detect one or more irregularities. The security module generates notifications to one or more users in response to the observation module detecting the one or more irregularities.

A method for managing network security is disclosed. The method identifies each node of a network (the network comprising a plurality of virtual local area networks and storage area networks), gathers information for each node of the network, analyzes the network to detect one or more irregularities, and generates notifications to one or more users in response to detecting the one or more irregularities.

A computer program product for managing network security is disclosed, the computer program product including an inventory module, a survey module, an observation module, and a security module. The inventory module identifies each node of a network, the network comprising a plurality of virtual local area networks and a storage area network. The survey module gathers information for each node of the network. The observation module analyzes the network to detect one or more irregularities. The security module generates notifications to one or more users in response to the observation module detecting the one or more irregularities.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
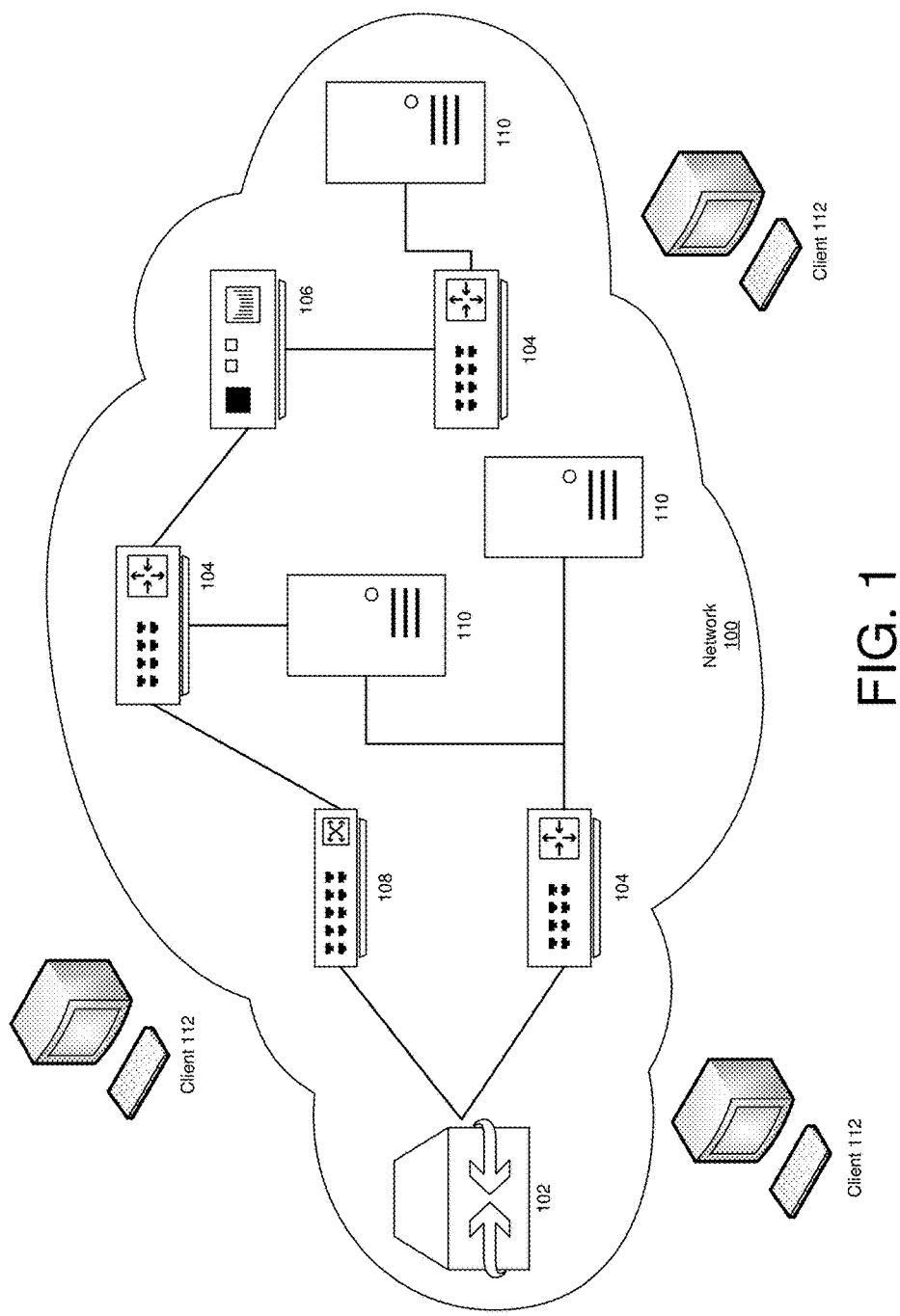
FIG. 1 is a schematic block diagram illustrating one embodiment of a data network.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk drive (HDD), a solid-state drive (SSD), a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1 is a schematic block diagram illustrating one embodiment of a data network 100. The data network 100 may include a wireless network, such as a Wi-Fi network, a Bluetooth network, and the like. In one embodiment, the data network 100 may include a wide area network ("WAN"), a storage area network ("SAN"), a local area network ("LAN"), an optical fiber network, the Internet, or other data network known in the art. The data network 100 may include two or more networks. The data network 100 may span across two or more data centers. The data network 100 includes a plurality of nodes. A node may be a gateway 102, router 104, bridge 106, switch 108, server 110, disk storage system (not shown), and/or other networking equipment. The server 110 may be any computer equipment accessible over the data network 100, including but not limited to a database server, a storage server, a file server, a mainframe server, or the like. A server 110 controls one or more disk storage systems. Clients 112 can store, access, manage, and process data within the data network 100. A client 112 may be any computer, including but not limited to a desktop computer, laptop computer, tablet computer, smartphone, television, set top box, video game console, and the like.

In one embodiment, the data network 100 is used for cloud computing, where one or more networks of remote servers 110 store, manage, and process data. Depending on how they are used, data may be stored as objects or blocks. Object-based storage stores data as objects, and each object includes three things: the data itself, metadata (e.g., size, confidentiality, permissions, author, creation date), and a unique identifier (i.e., address) that allows the object to be located within a distributed system. Object-based storage is ideal for storing large sets of data and/or static content (e.g., images, audio, video) because it i) uses sequential I/O to read data; ii) utilizes a flat file structure; and iii) includes metadata within the object itself. Object-based storage is easily scalable given the flat file structure, since expanding storage means just adding more storage nodes. Including the metadata with each object, as opposed to splitting up the data into blocks, reduces management overhead. Since all the data is self-contained within an object instead of being distributed across multiple devices or networks, serial I/O increases efficiency when reading and writing the data. Object-based storage also allows for easy replication of files to ensure redundancy because an object contains all of the data itself and can be copied more easily than data split into multiple parts. A disadvantage of object-based storage is objects have to be manipulated as a whole unit, meaning that the entire object has to be accessed, updated, and re-written, thus impacting performance.

Block-based storage stores data as equal sized blocks of raw data, with each individual block containing data and an associated address. Block-based storage excels at random read/write I/O and database storage because updates to the data can occur via individual block updates. Thus, block-based storage is very desirable for data that is often manipulated, such as transactional databases. Storage area networks ("SANs") are examples of block-based storage known in the art. A storage area network creates universal storage connectivity between clients 112 and remote storage devices.

A data network 100 can abstract the physical location of the data (i.e., the actual disk storage system(s) where data are stored) from the user through storage virtualization. Virtualization presents clients 112 and users a logical space for data storage (e.g., disk volume, folder) and handles mapping the logical space to the actual physical location of the data. Virtualization may be handled by a server 110, a switch 108, or other node in the data network 100. A data network 100 that provides storage virtualization includes logical storage in addition to the physical storage devices.

Figure 2:
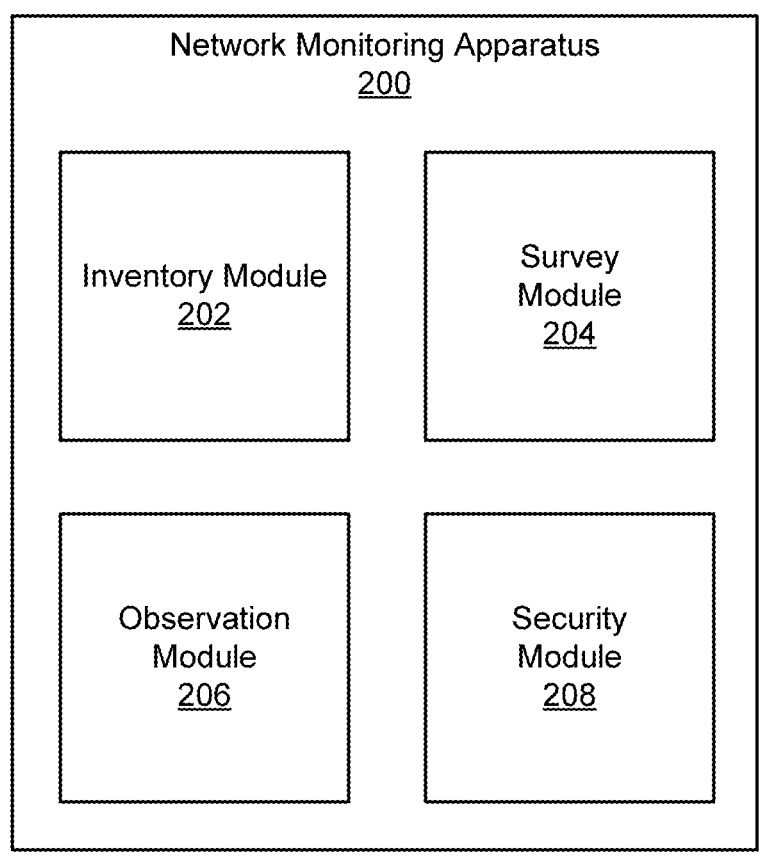
FIG. 2 is a schematic block diagram illustrating one embodiment of a network monitoring apparatus in accordance with the present invention.

FIG. 2 is a schematic block diagram illustrating one embodiment of a network monitoring apparatus 200 in accordance with the present invention. The networking monitoring apparatus 200 includes an inventory module 202, a survey module 204, an observation module 206, and a security module 208, which are described below.

The inventory module 202 creates a catalog of the nodes (i.e., identifies each node) within a data network 100 ("network catalog"). A network catalog includes information regarding each node on the network. The inventory module 202 typically resides on a node in the data network 100. In one embodiment, the network catalog includes, for each node in the data network 100, one or more sets of an identifier and an address for the node. A node identifier uniquely identifies the node within the data network 100. The node address uniquely identifies the location of the node within the data network 100. In one embodiment, the node address serves as the node identifier. A node can have multiple network interfaces and multiple network interfaces of a specific type (hardware/software), and therefore may have an identifier and an address for each network interface. Each type of network interface uses a specific protocol for communication. Examples of network interfaces and protocols include Ethernet, ATM, Wi-Fi, FDDI, token ring, and the like. In one embodiment, a node with an Ethernet interface may have a node address that includes a media access control ("MAC") address. In another embodiment, a node address includes the IP address of the node. In certain embodiments, a node address includes a port number.

The inventory module 202 creates a network catalog by discovering an identifier and an address of each node on the data network 100. The inventory module 202 uses one or more networking protocols known in the art to discover all the nodes on the data network 100. In one embodiment, the inventory module 202 programmatically emulates hardware network interface controllers to discover all the nodes on the data network 100. A networking protocol is a standard set of rules that a plurality of nodes understand and use to communicate with each other for various purposes (e.g., discovery, data transfer, etc.). A node may have multiple network interfaces and therefore utilize multiple networking protocols. A node can communicate with another node if both nodes support the same networking protocol(s). Networking protocols can be categorized within the seven layers of the Open Systems Interconnection ("OSI") Reference Model. Nodes in a data network 100 typically discover other nodes using networking protocols categorized within layer 2 and layer 3. Layer 2 is the data link layer, and protocols within this layer include Point-to-Point Protocol ("PPP"), Link Layer Discovery Protocol ("LLDP"), and the Spanning Tree Protocol ("STP"). Layer 2 has two sublayers, the logical link sublayer and the media access control ("MAC") sublayer. The data transmission unit for layer 2 is a frame. Layer 3 is the network layer, and networking protocols within this layer include Internet Protocol ("IPv4/IPv6") and Internet Control Message Protocol ("ICMP"). The data transmission unit for layer 3 is a packet. There are other networking protocols known within the art that operate in layers 2 and 3. A node that supports networking protocols from a particular layer n may be referred to as a Layer n node. A node can be a single layer node because it only supports networking protocols from a specific layer. A node can also belong to multiple layers because it supports networking protocols from different layers. Some nodes are referred to and known in the art as layer 2.5 nodes. These nodes provide layer 2.5/3 functionality or services to a layer 2 only node. An example of a layer 2.5 networking protocol is Transparent Interconnection of Lots of Links ("TRILL").

In one embodiment, the inventory module 202 discovers nodes on a data network 100 comprising a plurality of virtual LANs ("VLANs") and a SAN. In this embodiment, the inventory module 202 discovers the layer 2 nodes, layer 2.5 nodes, and layer 3 nodes in each VLAN, as well as the nodes in the SAN. A VLAN abstracts the idea of a LAN by allowing nodes on a single LAN segment or different segments of a LAN to be grouped together. Nodes within a VLAN can communicate directly with each other. Communication between nodes on different VLANs have to go through a router.

The inventory module 202 discovers layer 2 nodes in a VLAN by emulating a layer 2 node. In one embodiment, emulating a layer 2 node includes broadcasting an activation frame for each layer 2 networking protocol known in the art from the node it resides. Each layer 2 networking protocol has its own frame format and an associated reserved or "well known" MAC address. A MAC address, or Media Access Control address, is typically a globally unique identifier assigned to network devices and often referred to as a hardware or physical address. MAC addresses are six bytes in length and written in MM:MM:MM:SS:SS:SS format. The first three bytes represent an identifier for the device manufacturer as assigned by an Internet standards body. The second three bytes represent a serial number assigned by the manufacturer. Well known MAC addresses are associated with certain networking protocols instead of specific network devices.

The contents of each activation frame broadcasted by the inventory module 202 is protocol specific, but their purposes are identical—to cause the other layer 2 nodes within the VLAN that support a specific layer 2 networking protocol to transmit a frame to the inventory module 202 containing an identifier and an address for that node. In one embodiment, the activation frames broadcast by the inventory module 202 are initialization frames for each layer 2 networking protocol. For example, the inventory module 202 may reside on a switch 108 that uses the Spanning Tree Protocol ("STP") to identify the other switches within a VLAN. In this example, the inventory module 202 generates and broadcasts an STP frame with its associated reserved MAC address in the destination MAC address field of the frame. When other layer 2 switches in the VLAN receive this frame, typically called a Bridge Protocol Data Unit ("BPDU"), they recognize the reserved MAC address and start broadcasting STP frames containing information about themselves to compute a spanning tree route for the switches in the VLAN. The exchange of frames lets the inventory module 202 identify the other switches in the VLAN. In another embodiment, the activation frames broadcast by the inventory module 202 are discovery frames for each layer 2 networking protocol. The discovery frame for a networking protocol contains a message that prompt nodes supporting that networking protocol to transmit a response frame to the inventory module 202, thus allowing the inventory module 202 to identify the responding node.

Upon receiving a frame from another node, the inventory module 202 records an identifier and an address for the source node of the incoming frame. In one embodiment, the inventory module 202 also records a timestamp of when the incoming frame was received. The timestamp is useful in diagnosing network connectivity or security issues by letting the inventory module 202 or another module determine when a node first or most recently responded. The inventory module 202 repeats the process described above (i.e., broadcasting a frame for each layer 2 protocol known in the art) for each VLAN in the data network 100 until it discovers all the layer 2 nodes in the data network 100.

The inventory module 202 discovers layer 2.5 nodes in a VLAN by emulating a layer 2.5 node. Emulating a layer 2.5 node includes broadcasting an activation frame for each layer 2.5 networking protocol known in the art from the node it resides, or responding to activation frames from other layer 2.5 nodes (e.g., routing bridges). Each layer 2.5 networking protocol has its own frame format and an associated reserved or well known MAC address. The contents of each frame broadcasted by the inventory module 202 is protocol specific, but their purposes are identical—to cause the other layer 2.5 nodes within the VLAN that support a specific layer 2.5 networking protocol to transmit a frame to the inventory module 202 containing an identifier and an address for that node. In one embodiment, the activation frames broadcast by the inventory module 202 are initialization frames for each layer 2.5 networking protocol. For example, the inventory module 202 may reside on a routing bridge 106 that uses TRILL to identify the other routing bridges within a VLAN. In this example, the inventory module 202 generates and broadcasts a TRILL "Hello" frame containing a link state advertisement. A link state advertisement identifies the node (e.g., router) that generated the advertisement ("N1"), all the other nodes directly connected to N1, and the cost of each link between N1 and its directly connected nodes. When other routing bridges receive this frame, they start broadcasting "Hello" messages containing link state advertisements. The exchange of messages lets the inventory module 202 identify the other routing bridges in the VLAN. In another embodiment, the activation frames broadcast by the inventory module 202 are discovery frames for each layer 2.5 networking protocol. The discovery frame for a networking protocol contains a message that prompt nodes supporting that networking protocol to transmit a response frame to the inventory module 202, thus allowing the inventory module 202 to identify the responding node.

Upon receiving a frame from another node, the inventory module 202 records an identifier and an address for the source node of the incoming frame. In one embodiment, the inventory module 202 also records a timestamp of when the incoming frame was received. The timestamp is useful in diagnosing network connectivity or security issues by letting the inventory module 202 or another module determine when a node first or most recently responded. The inventory module 202 repeats the process described above (i.e., broadcasting a frame for each layer 2.5 protocol known in the art) for each VLAN in the data network 100 until it discovers all the layer 2.5 nodes in the data network 100.

The inventory module 202 discovers layer 3 nodes in a VLAN by emulating layer 3 nodes. Emulating a layer 3 node includes broadcasting an activation packet for each layer 3 networking protocol known in the art from the node it resides, or responding to activation packets from other layer 3 nodes (e.g., routers). Each layer 3 networking protocol has its own packet format and an associated reserved or "well known" layer 3 address (e.g., reserved IP addresses in IPv4 or IPv6). The layer 3 packets become part of the payload in layer 2 frames. The contents of each packet broadcasted by the inventory module 202 is protocol specific, but their purposes are identical—to cause the other layer 3 nodes within the VLAN that support a specific layer 3 networking protocol to transmit a packet to the inventory module 202 containing an identifier and an address for that node. In one embodiment, the activation packets broadcast by the inventory module 202 are initialization packets for each layer 3 networking protocol. For example, the inventory module 202 may emulate a router 104 that supports the open shortest path first ("OSPF") routing protocol within a VLAN. In this example, the inventory module 202 generates and broadcasts an OSPF "Hello" message with its associated reserved IP address in the destination IP address field of the packet. When other layer 3 routers in the VLAN receive the packet containing the "Hello" message, they recognize the reserved IP address and also send "Hello" messages to allow other routers to discover each other. The exchange of messages lets the inventory module 202 identify the other routers in the VLAN. In another embodiment, the activation packets broadcast by the inventory module 202 are discovery packets for each layer 3 networking protocol. The discovery packet for a networking protocol contains a message that prompt nodes supporting that networking protocol to transmit a response packet to the inventory module 202, thus allowing the inventory module 202 to identify the responding node.

Upon receiving a packet from another node, the inventory module 202 records an identifier and an address for the source node of the incoming packet. In one embodiment, the inventory module 202 also records a timestamp of when the incoming packet was received. The timestamp is useful in diagnosing network connectivity or security issues by letting the inventory module 202 or another module determine when a node first or most recently responded. The inventory module 202 repeats the process described above (i.e., broadcasting a packet for each layer 3 protocol known in the art) for each VLAN in the data network 100 until it discovers all the layer 3 nodes in the data network 100.

The inventory module 202 discovers nodes in a SAN by emulating a device that uses a networking protocol used to transfer data to and from storage nodes used in SANs. Examples of such networking protocols include Fibre Channel ("FC") and Serial Attached SCSI ("SAS"). Devices and ports on a SAN (e.g., host bus adaptors, disk subsystems, switches) are uniquely identified by World Wide Names ("WWN"). World Wide Names consist of 16 hexadecimal digits grouped as eight pairs. A World Wide Name contains six hexadecimal digits assigned by the IEEE that uniquely identify a device manufacturer. In addition, the manufacturer supplies a unique identifier for the device as part of the World Wide Name for the device. A World Wide Name may be a World Wide Node Name ("WWNN") or a World Wide Port Name ("WWPN"). Each SAN node has a WWNN and one or more ports, where a port is assigned a WWPN. A WWPN is the functional equivalent in storage area network of a MAC address in the Ethernet protocol. A World Wide Port Name may be generated in software (e.g., firmware, microcode, or kernel drivers) and seeded from the World Wide Node Name.

In one embodiment, the inventory module 202 discovers nodes in a SAN by emulating a fibre channel switch, and then using known in the art fibre channel commands to discover one or more nodes on the SAN, as well as their associated ports. In another embodiment, the inventory module 202 discovers nodes in a SAN by emulating a Serial Attached SCSI ("SAS") device, and then using known in the art SCSI management protocol commands to discover one or more nodes on the SAN, as well as their associated ports. Upon discovering one or more nodes on the SAN, the inventory module records each node's WWNN and associated WWPNs.

The survey module 204 gathers information for each node in the network catalog in response to the inventory module identifying the node. The survey module 204 gathers information for each identified node by transmitting a query to the node and receiving a response containing information regarding the properties of the node, and then storing the properties of the node. The properties of the node include, without limitation, name (if separate from node identifier or address(es)), function (e.g., switch, router, server, initiator, target, etc.), manufacturer, model number, serial number, BIOS, operating system, supported protocol(s), port(s) used, first time of discovery, most recent time of discovery, uptime, and amount of available storage. In one embodiment, the survey module 204 transmits a query message, and the queried node responds, using the same networking protocol used to identify the node by the inventory module 202. In a certain embodiment, the survey module 204 stores one or more timestamped copies of the properties of each node in the network. In one embodiment, the survey module 204 gathers information for each node in the network catalog on a periodic basis in response to the inventory module identifying the node.

The observation module 206 analyzes the data network 100 to detect irregularities. In one embodiment, an irregularity is the presence of one or more new nodes (e.g., switch, router, server, disk storage system) in the data network 100. In another embodiment, an irregularity is the absence (due to disconnection or disability) of one or more nodes in the data network 100. In a further embodiment, an irregularity is a change in the node name, node identifier, or node address (e.g., MAC address, IP address, WWNN). In a certain embodiment, an irregularity is two or more nodes using the same name, identifier, or address. In some embodiments, an irregularity is a change in the world wide port name or change in the world wide port name to world wide node name association.

In one embodiment, the observation module 206 analyzes the data network 100 to detect irregularities by comparing the stored properties of a node (e.g., a stored baseline) to the most recently surveyed properties of the node. In one instance, the observation module 206 does this for every node in the network. In another instance, the observation module 206 does this randomly or in a predefined pattern/schedule to reduce processing load or time. As an example, the observation module 206 may detect a change in the MAC address for a switch 108 with the same identifier or name during a scheduled check of the node. In another embodiment, the observation module 206 analyzes the data network for irregularities by comparing changes in the properties of a node or set of nodes to a pre-approved network configuration. For example, the observation module 206 may notice that two new nodes have been added to data network 100 and compares the new network configuration to a set of pre-approved network configurations to determine whether there is an irregularity. The set of pre-approved network configurations may change depending over time to reflect planned changes to the network configuration. The comparison of the most recent network configuration with pre-approved network configurations may be done each time the inventory module 202 identifies the nodes with the data network 100. Or it may be done according to an established pattern (e.g., rotating through different VLANs or subnets within the data network 100) and/or schedule (e.g., every five minutes), depending on the size of the network. Irregularities within a network may be assigned a rating by the observation module 206 that signals a severity of the irregularity.

The security module 208 generates notifications to one or more users in response to the observation module 206 detecting one or more irregularities in the network. Notifications can take various forms, including without limitation, text/SMS messages, instant messages, emails, social media posts, automated calls, or messages within a software application. In one embodiment, the security module 208 generates notifications in response to the observation module 206 detecting irregularities in the network above a predetermined threshold. The threshold may be a number of irregularities and/or a type of irregularity. In another embodiment, the security module 208 generates notifications in response to the observation module 206 detecting irregularities in the network above a predetermined threshold over a certain period of time.

Figure 3:
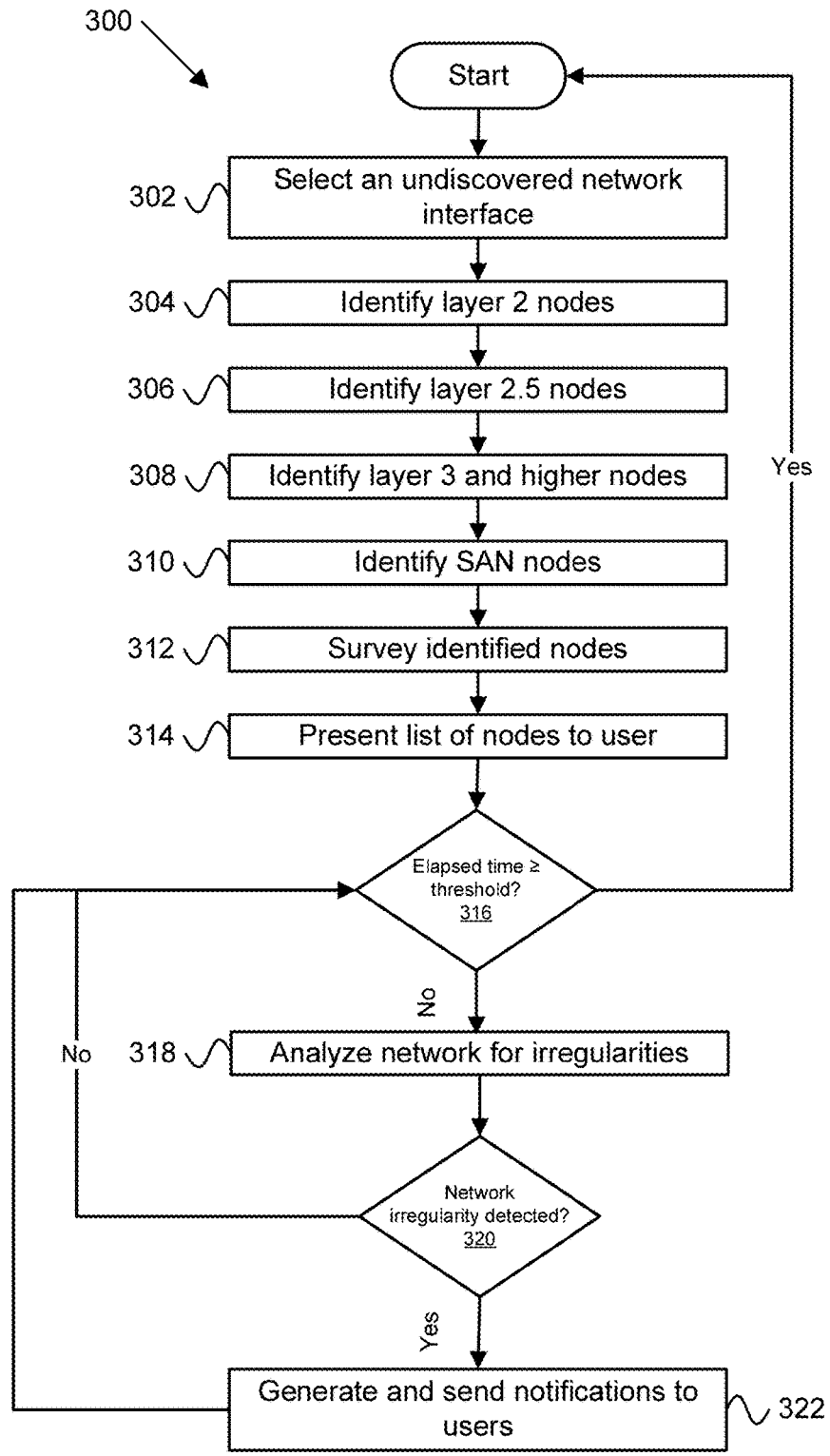
FIG. 3 is a schematic flow chart diagram illustrating one embodiment of a method for managing LAN/SAN security in accordance with one embodiment of the present invention.

FIG. 3 is a schematic flow chart diagram illustrating one embodiment of a method 300 for managing LAN/SAN security in accordance with one embodiment of the present invention. The method 300 starts and selects 302 a previously undiscovered network interface. The method 300 identifies 304 layer 2 nodes using the network interface, which is described further below with respect to FIG. 4. The method 300 identifies 306 layer 2.5 nodes using the network interface, which is described further below with respect to FIG. 5. The method 300 identifies 308 layer 3 or higher nodes using the network interface, which is described further below with respect to FIG. 6. The method 300 identifies 310 SAN nodes using the network interface, which is described further below with respect to FIG. 7. The method 300 surveys 310 the identified nodes. The method 300 presents 314 the list of identified nodes to a user. In one embodiment, the method 300 presents 314 the list of identified nodes to a user through an application (e.g., browser, desktop, and/or mobile). The method 300 checks 316 if the elapsed time is greater than a threshold amount of time. In one embodiment, the elapsed time is measured from when the method 300 starts. In another embodiment, the elapsed time is measured from when all the nodes have been identified. The threshold may be set by a user. In one instance, the threshold is a function of how long it takes to identify the nodes in the network (e.g., 2×, 3×, etc.). If the elapsed time is longer than or equal to the threshold time, then the method 300 restarts at step 302 to rediscover the nodes in the network. In one embodiment, if the elapsed time is longer than or equal to the threshold time, the method 300 uses the same network interface and restarts at step 304. If the elapsed time is shorter than the threshold time, then the method 300 analyzes 318 the network for irregularities. If the method 300 does not detect 320 any irregularities in the network, then the method 300 checks 316 if the elapsed time at that point is longer than or equal to the threshold amount of time, and proceeds from there. If the method 300 does detect 320 an irregularity in the network, then the method 300 generates and sends 322 one or more notifications to users registered to receive such notifications. Once notifications have been generated and sent to users, the method 300 checks 316 if elapsed time at that point is longer than or equal to the threshold amount of time, and proceeds from there.

Figure 4:
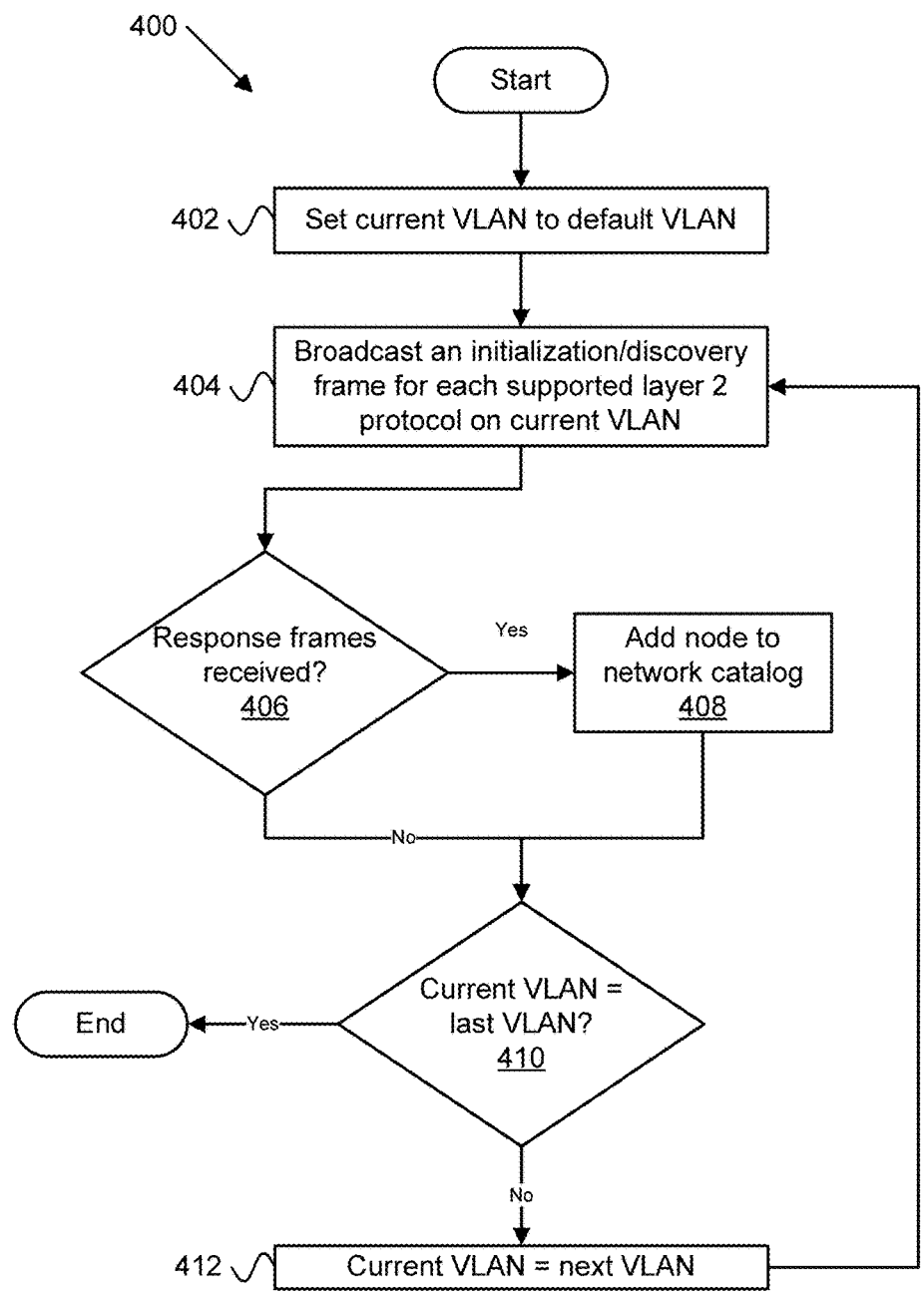
FIG. 4 is a schematic flow chart diagram illustrating one embodiment of a method for discovering layer 2 nodes in a network in accordance with one embodiment of the present invention.

FIG. 4 is a schematic flow chart diagram illustrating one embodiment of a method 400 for discovering layer 2 nodes in a data network 100. The method 400 starts and sets 402 the current VLAN as the default VLAN. The method 400 broadcasts 404 an activation frame for each supported layer 2 protocol on the current VLAN. The method 400 checks 406 for response frames from other layer 2 nodes on the VLAN. If response frames are received from other nodes, then the method 400 adds 408 the node that sent the response frame to the network catalog. If no response frames are received, then the method 400 checks 410 to see if the current VLAN is the last VLAN. If the current VLAN is the last VLAN, then the method 400 ends. If the current VLAN is not the last VLAN, then the method 400 sets the current VLAN to the next VLAN and returns to step 404.

Figure 5:
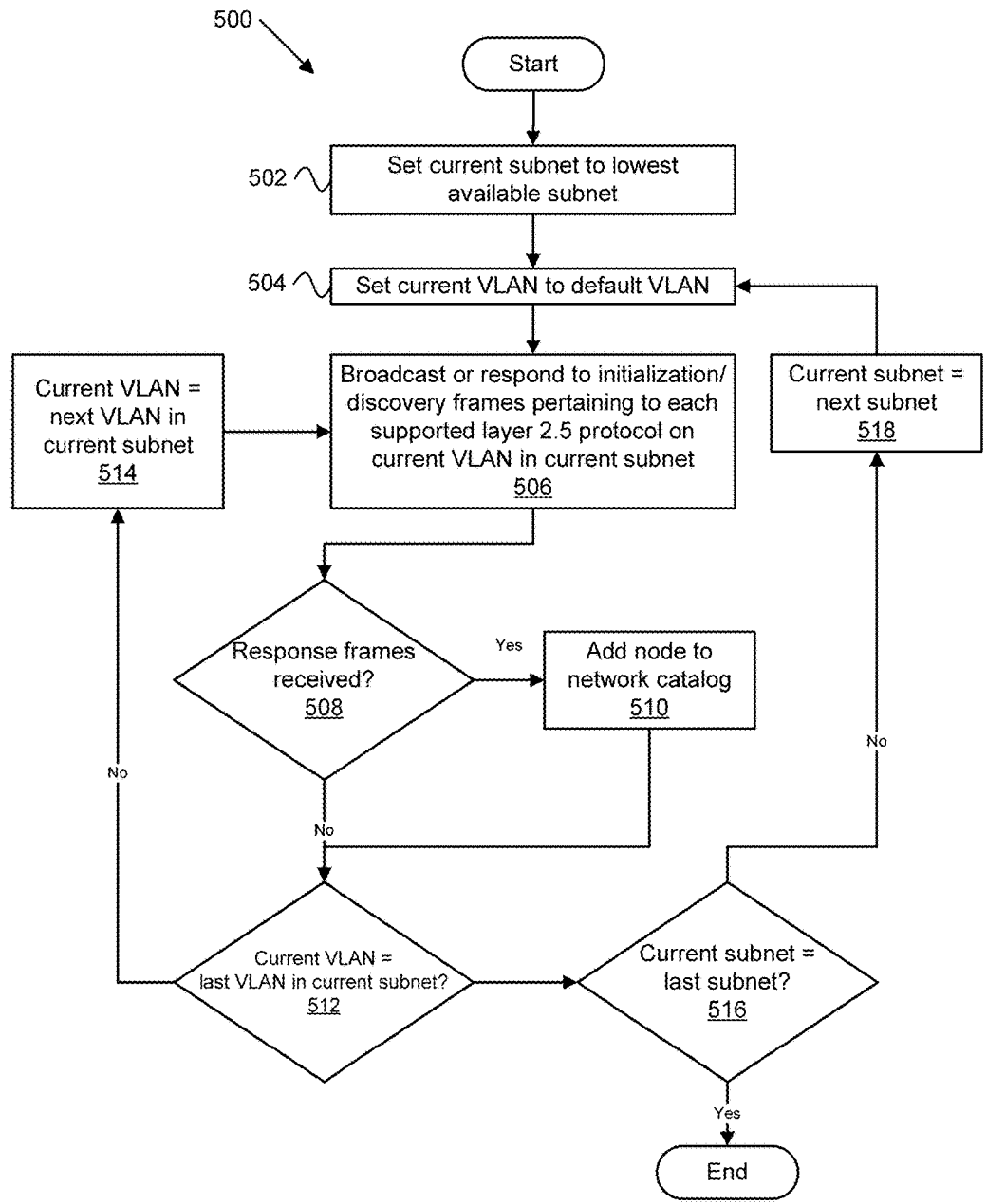
FIG. 5 is a schematic flow chart diagram illustrating one embodiment of a method for discovering layer 2.5 nodes in a network in accordance with one embodiment of the present invention.

FIG. 5 is a schematic flow chart diagram illustrating one embodiment of a method 500 for discovering layer 2.5 nodes in a data network 100. The method 500 starts and sets 502 the current subnet to the lowest available subnet within the data network 100. The method 500 sets 504 the current VLAN to the default VLAN on the current subnet. The method 500 broadcasts or responds 506 to activation frames pertaining to each supported layer 2.5 protocol on the current VLAN of the current subnet. The method 500 checks 508 for response frames from other layer 2.5 nodes on the VLAN. If response frames are received from other nodes, then the method 500 adds 510 the node that sent the response frame to the network catalog. If no response frames are received, then the method 500 checks 512 to see if the current VLAN is the last VLAN in the current subnet. If the current VLAN is not the last VLAN in the current subnet, then the method 500 sets 514 the current VLAN to be the next VLAN in the current subnet and returns to step 506. If the current VLAN is the last VLAN in the current subnet, then the method 500 checks 516 if the current subnet is the last subnet in the data network 100. If the current subnet is the last subnet, then the method 500 ends. If the current subnet is not the last subnet, then the method 500 sets 518 the current subnet to the next available subnet and returns to step 504.

Figure 6:
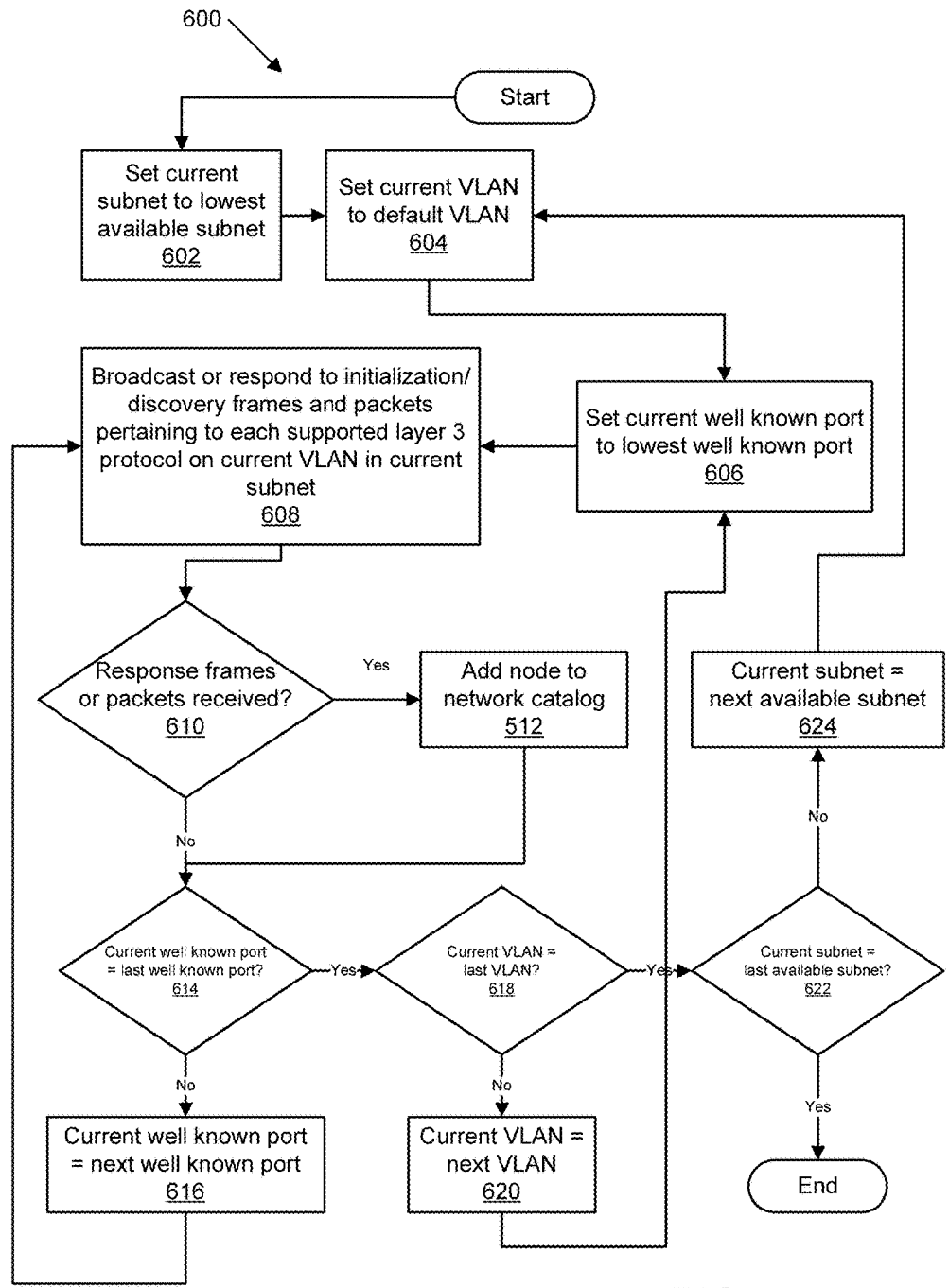
FIG. 6 is a schematic flow chart diagram illustrating one embodiment of a method for discovering layer 3 nodes in a network in accordance with one embodiment of the present invention.

FIG. 6 is a schematic flow chart diagram illustrating one embodiment of a method 600 for discovering layer 3 or higher nodes in a data network 100. The method 600 starts and sets 602 the current subnet to the lowest available subnet within the data network 100. The method 600 sets 604 the current VLAN to the default VLAN on the current subnet. The method 600 sets 606 the current well known port to the lowest well known port. A well known port is a set of ports reserved for privileged services in the range of 0 to 1024. The method 600 broadcasts or responds 608 to activation frames and packets pertaining to each supported layer 3 or higher protocol on the current VLAN of the current subnet. In one embodiment, the activation frames contain well known MAC addresses in the destination MAC address field. In a certain embodiment, the activation packets contain well known layer 3 addresses in the destination layer 3 address field (e.g., destination IP address field). In some embodiments, the activation packets include well known port numbers. The method 600 checks 610 for response frames or packets from other nodes on the VLAN. If response frames are received from other nodes, then the method 600 adds 612 the node that sent the response frame or packet to the network catalog. If no response frames or packets are received, then the method 600 checks 614 if the current well known port is the last well known port. In an embodiment, the method 600 checks 614 if the current well known port is the last supported well known port. If the current well known port is not the last well known port, the method 600 sets 616 the current well known port to be the next highest well known port, and the method 600 returns to step 608. If the current well known port is the last well known port on the current VLAN, then the method 600 checks 618 if the current VLAN is the last VLAN on the current subnet. If the current VLAN is not the last VLAN on the current subnet, then the method 600 sets 620 the current VLAN to be the next VLAN, and the method 600 returns to step 606. If the current VLAN is the last VLAN on the current subnet, then the method 600 checks 622 if the current subnet is the last available subnet in the data network 100. If the current subnet is not the last available subnet on the data network 100, then the method 600 sets 624 the current subnet to be the next available subnet, and the method 600 returns to step 604. If the current subnet is the last available subnet on the data network 100, then the method 600 ends. In summary, the method 600 broadcasts activation frames and packets using the lowest available well known port on the default VLAN of the lowest available subnet on a data network 100, adds responding nodes to the network catalog, and repeats this process for each well known port of each VLAN of each available subnet of the network.

Figure 7:
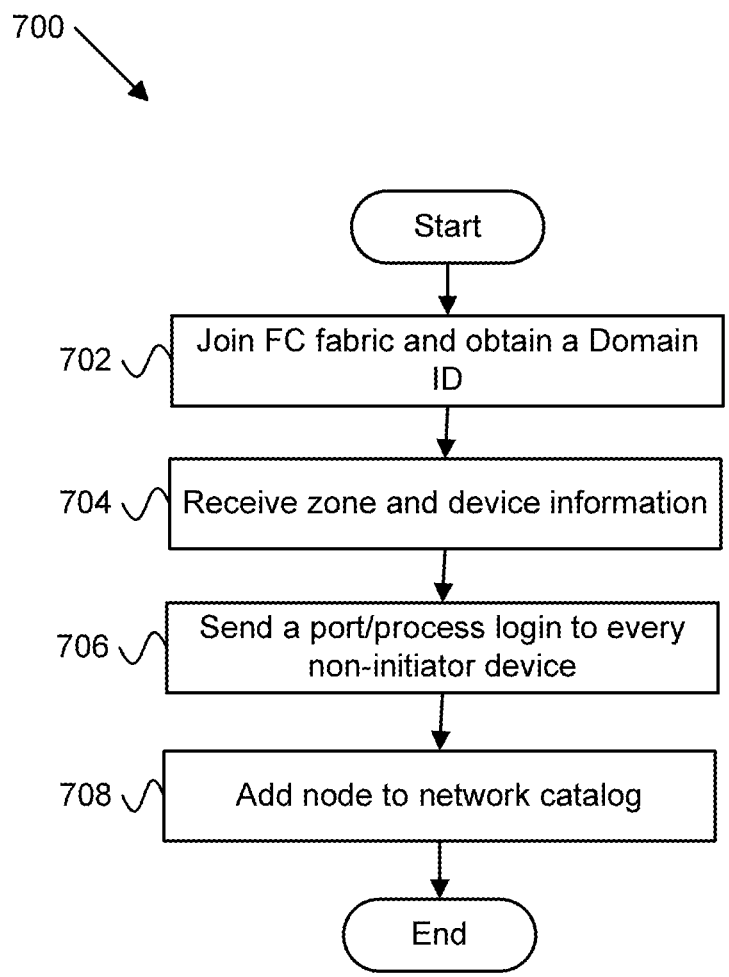
FIG. 7 is a schematic flow chart diagram illustrating one embodiment of a method for discovering nodes within a storage area network in accordance with one embodiment of the present invention.

FIG. 7 is a schematic flow chart diagram illustrating one embodiment of a method 700 for discovering SAN nodes. The method 700 starts and emulates a fibre channel switch or fibre channel router to join 702 the fibre channel fabric and obtain a domain ID. Each fibre channel switch has a unique domain ID. The method 700 receives 704 fibre channel zone and device information for the fibre channel fabric. Fibre channel fabric can be partitioned into smaller zones to restrict interference and/or add security. In an embodiment, zoning restrictions mean that each device within a zone can only query for the addresses of the other devices within the same zone. The method 700 sends 706 a port login or process login to each device within the zone. Upon login, the devices exchange operational parameters (e.g., frame size, supported services, addressing, etc.). The method 700 adds 708 each node to the network catalog, and method 700 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a hardware processor;
inventory logic that identifies each node of a network, wherein:
the network comprises a plurality of virtual local area networks and storage area networks, and
the inventory logic discovers different types of nodes in the network by broadcasting a request to each node and receiving a response to the request from each node, wherein each request emulates one of a plurality of types of nodes by utilizing different networking protocols of a plurality of data link layer networking protocols corresponding to each different type of node;
survey logic that gathers information for each node of the network based on the response received from each node;
observation logic that analyzes the network to detect one or more irregularities related to one or more characteristics of a node in the network; and
security logic that generates notifications to one or more users in response to the observation logic detecting the one or more irregularities.

2. The apparatus of claim 1, wherein the request to each node includes an activation frame for each different networking protocol.

3. The apparatus of claim 2, wherein the activation frame is selected from one of an initialization frame and a discovery frame of a particular networking protocol.

4. The apparatus of claim 2, wherein:
each response received from each node comprises a frame from a particular node in response to the activation frame, the frame including at least an identifier and an address of the particular node; and
the inventory logic records the identifier, the address of the particular node, and a timestamp of the frame received from a particular node.

5. The apparatus of claim 1, wherein the observation logic analyzing the network to detect the one or more irregularities comprises comparing one or more stored characteristics of one or more nodes with a most recently surveyed characteristic of the one or more nodes.

6. The apparatus of claim 1, wherein the observation logic analyzing the network to detect the one or more irregularities comprises comparing one or more characteristics of a set of nodes in the network to a pre-approved network configuration.

7. The apparatus of claim 1, wherein the one or more characteristics of the node comprises one or more of: an addition of the node, a removal of the node, a name change of the node, an identifier change of the node, an address change of the name, a same name as another node in the network, a same identifier as another node in the network, a same address as another node in the network, a port name change for the node, and a change in a name association of the node.

8. A method for managing network security comprising:
identifying, by a processor, each node of a network, wherein:
the network comprises a plurality of virtual local area networks and storage area networks, and
the processor discovers different types of nodes in the network by broadcasting a request to each node and receiving a response to the request from each node, wherein each request emulates one of a plurality of types of nodes by utilizing different networking protocols of a plurality of data link layer networking protocols corresponding to each different type of node;
gathering information for each node of the network based on the response received from each node;

analyzing the network in detecting one or more irregularities related to one or more characteristics of a node in the network; and generating notifications to one or more users in response to detecting the one or more irregularities.

9. The method of claim 8, wherein the request to each node includes an activation frame for each different networking protocol.

10. The method of claim 9, wherein the activation frame is selected from one of an initialization frame and a discovery frame of a particular networking protocol.

11. The method of claim 9, wherein:

each response received from each node comprises a frame from a particular node in response to the activation frame, the frame including at least an identifier and an address of the particular node; and identifying each node of the network further comprises recording the identifier, the address of the particular node, and a timestamp of the frame received from a particular node.

12. The method of claim 8, wherein:

the response received from each node includes one or more characteristics of the node, wherein the characteristics of the node comprise its function, supported protocols, and available storage; and gathering information for each node of the network comprises storing the characteristics of the node.

13. The method of claim 8, wherein analyzing the network in detecting one or more irregularities comprises comparing one or more characteristics of one or more nodes with a most recently surveyed characteristic of the one or more nodes.

14. The method of claim 8, wherein analyzing the network in detecting the one or more irregularities comprises comparing one or more characteristics of a set of nodes in the network to a pre-approved network configuration.

15. A computer program product for managing network security, the computer program product comprising a non-transitory computer readable storage medium having program instructions embodied therewith, the program instructions readable/executable by a processor to cause the processor to:

identify, by the processor, each node of a network, wherein:

the network comprises a plurality of virtual local area networks and storage area networks, and the processor discovers different types of nodes in the network by broadcasting a request to each node and receiving a response to the request from each node, wherein each request emulates one of a plurality of types of nodes by utilizing different networking protocols of a plurality of data link layer networking protocols corresponding to each different type of node;

gather, by the processor, information for each node of the network based on the response received from each node;

analyze, by the processor, the network in detecting one or more irregularities related to one or more characteristics of a node in the network; and generate, by the processor, notifications to one or more users in response to the processor detecting the one or more irregularities.

16. The computer program product of claim 15, wherein the request to each node includes an activation frame for each different networking protocol.

17. The computer program product of claim 16, wherein the activation frame is selected from one of an initialization frame and a discovery frame of a particular networking protocol.

18. The computer program product of claim 16, wherein:

each response received from each node comprises a frame from a particular node in response to the activation frame, the frame including at least an identifier and an address of the particular node; and identifying each node of the network further comprises recording the identifier, the address of the particular node, and a timestamp of the frame received from a particular node.

19. The computer program product of claim 15, wherein:

the response received from each node includes one or more characteristics of the node, wherein the characteristics of the node comprise its function, supported protocols, and available storage; and gathering information for each node of the network comprises storing the properties of the node.

20. The computer program product of claim 15, wherein analyzing the network in detecting the one or more irregularities comprises comparing one or more characteristics of one or more nodes with a most recently surveyed characteristic of the one or more nodes.

* * * * *